Patented Nov. 18, 1930

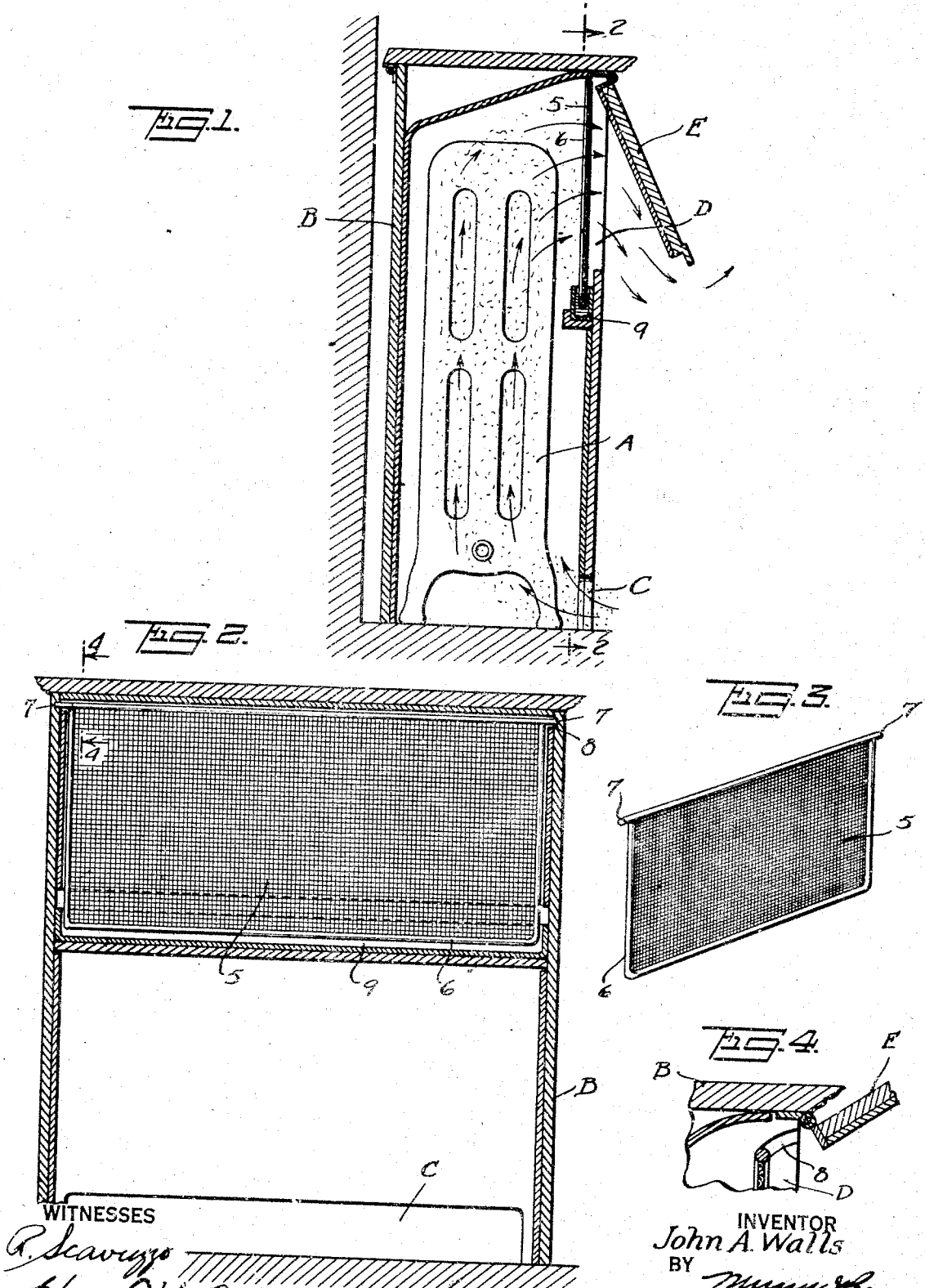

1,782,374

UNITED STATES PATENT OFFICE

JOHN A. WALLS, OF BALTIMORE, MARYLAND

AIR-FILTERING DEVICE FOR HEATING APPARATUS

Application filed March 12, 1929. Serial No. 346,442.

This invention relates generally to an apparatus for circulating and heating air in a room, and refers particularly to a filtering device for use in connection therewith for straining and removing dust from the air coincident with said circulation.

The invention primarily comprehends in an apparatus for circulating and heating the air in a room, such as a radiator provided with a cover of the type set forth in my copending application, Serial No. 256,006, and in which the cover is provided with a cold air intake opening and a heated air outlet opening, means arranged within or framed by one of said openings for filtering the air circulated therethrough in order to remove the dust coincident with the circulation of said air.

More specifically, the invention comprehends in an apparatus of the character set forth, an air filtering means which includes an absorbent foraminous material adapted to be continuously moistened for obtaining a wet filtration of the dust particles from the circulated air.

As a further feature, the invention contemplates a filtering material of the character specified by virtue of which moisture is picked up by the circulated air to obtain a humidifying effect and the beneficial results thereof.

The invention further aims to provide in an apparatus for circulating and heating air in a room, means for removably separating the filtering element therefrom whereby cleansing of the same is facilitated.

The invention aims furthermore to provide a filtering means of the character set forth and for the purpose specified which is simple in construction, inexpensive to manufacture and which is highly efficient in its purpose.

With the above recited and other objects in view, reference is had to the following description and accompanying drawings, in which there is exhibited one example or embodiment of the invention, while the claim defines the actual scope of the same.

In the drawings:

Figure 1 is a transverse sectional view through the apparatus with the filtering means in applied position.

Figure 2 is a longitudinal sectional view taken approximately on the line 2—2 of Figure 1.

Figure 3 is a detail perspective view of the filtering panel removed.

Figure 4 is a detail fragmentary sectional view taken approximately on the line 4—4 of Figure 2, illustrating the manner in which the filtering panel is inserted or removed.

Referring to the drawings by characters of reference, A designates a radiator which is enclosed by a cover B having adjacent its lower end a cold air inlet opening C and which is further provided adjacent its upper end with a heated air outlet D with which a shutter or closure element E cooperates for completely closing or regulating the opening of the outlet D.

In order to provide means for filtering the air which circulates through the cover B and is heated by the radiator A, a foraminous panel 5 may be arranged to cover either or both of the openings C and D. Preferably, the panel is arranged to intercept the circulated air as it is heated through the outlet opening D and the panel is illustrated as framed by said outlet opening. In practice, the filtering panel 5 is preferably of an absorbent material and is arranged to be constantly supplied with moisture to obtain a wet filtration effect which has been found to be more efficient than dry filtration. Obviously, in addition to the filtering of the air, moisture is supplied thereto for obtaining a humidifying effect and its beneficial results. As illustrated, the filtering panel 5 is supported by a frame 6 formed at its upper end with laterally projecting supporting trunnions 7 which are designed to be received by bearing grooves 8 formed in the end walls of the cover B. In order to supply the moisture to the panel 5, the lower end is immersed in a container or trough 9 which is designed to hold a supply of water or other liquid substance.

In operation, it is obvious that the cold air which enters the compartment defined by the cover B is heated by the heat radiated from the radiator A, and said heated air is discharged through the outlet opening D. The dust laden air in passing through the interstices of the foraminous moistened material 5 will be strained and the dust particles filtered therefrom so that the heated air emitted will be practically free of dust. Obviously, within the scope of the invention, the air passing through the filtering panel will be humidified and the liquid 9 may further be employed to disinfect, scent or otherwise treat the air emitted. When it is desired to cleanse the filtering panel, it is obvious that the same may be readily removed by opening the shutter E to the position illustrated in Figure 4 so that the trunnions may be freely removed from the bearing slots 8.

What is claimed is:

In an apparatus of the character described and for the purpose set forth, a casing including front, rear and side walls, the front wall having a cold air intake opening adjacent its lower end and a heated air outlet opening adjacent its upper end and means arranged within one of said openings for filtering and treating the air circulated therethrough, said means comprising a foraminous absorbent filtering panel and a receptacle in which the lower end of the filtering panel is immersed for absorbing a liquid contained in the receptacle, means for removably supporting the filtering panel in juxtaposition to the heated air outlet opening and the receptacle consisting of a supporting frame for the panel formed at its upper end with laterally projecting trunnions, the said side walls of the casing adjacent the upper ends of the heated air outlet opening having inwardly extending grooves for receiving the trunnions and a closure element hinged to the casing adjacent the upper end of the opening for intersecting the grooved portions of the side walls when the closure element is in a normal position, whereby to retain the panel frame and panel against accidental displacement.

JOHN A. WALLS.